April 24, 1956     F. E. ALTMAN     2,742,817
UNIT MAGNIFICATION CATADIOPTRIC LENS SYSTEM
Filed May 29, 1953     2 Sheets-Sheet 1
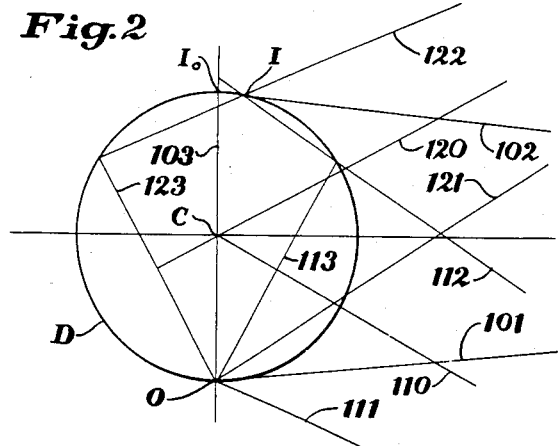
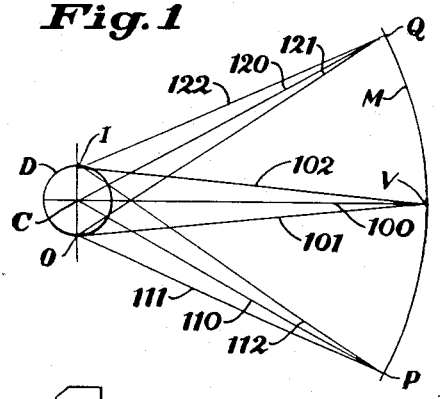
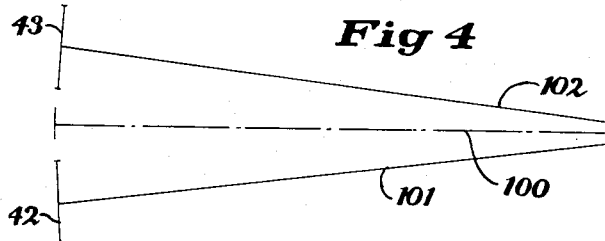
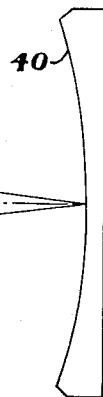
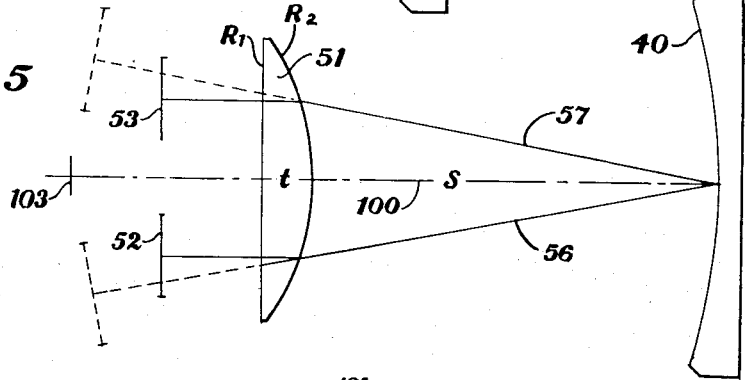
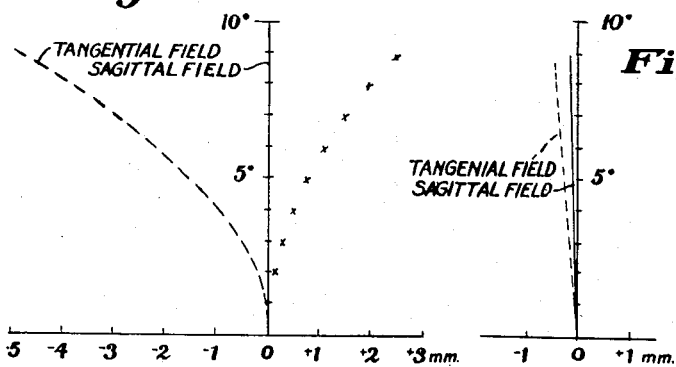
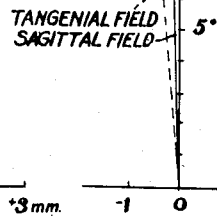
Fred E. Altman
INVENTOR.
BY Daniel J. Mayne
Harold F. Bennett
ATTORNEY & AGENT April 24, 1956     F. E. ALTMAN     2,742,817
UNIT MAGNIFICATION CATADIOPTRIC LENS SYSTEM
Filed May 29, 1953     2 Sheets-Sheet 2
Fig. 7
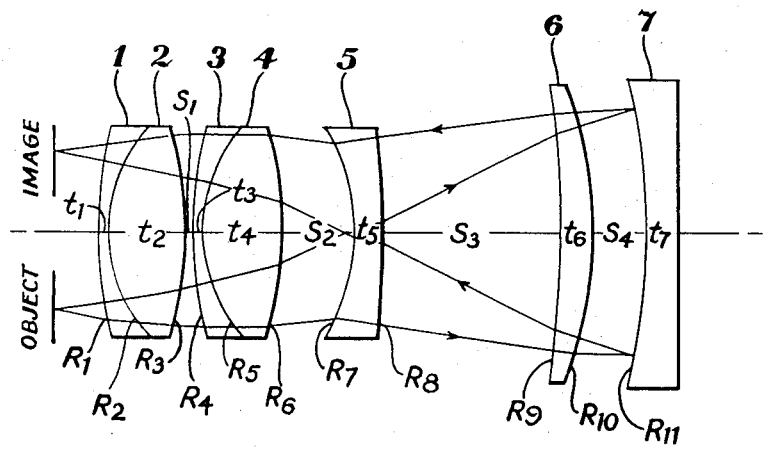
Fig. 8
| EQUIVALENT FOCUS 100 mm. | | | | |
|---|---|---|---|---|
| LENS | N | V | RADII | THICKNESSES |
| 1 | 1.689 | 30.9 | $R_1$= +91.2 mm | $t_1$= 1.7 mm. |
| 2 | 1.526 | 54.6 | $R_2$= +30.8 | $t_2$= 15.9 |
|  |  |  | $R_3$= -74.3 | $S_1$= 1.1 |
| 3 | 1.689 | 30.9 | $R_4$= +91.2 | $t_3$= 1.7 |
| 4 | 1.526 | 54.6 | $R_5$= +30.8 | $t_4$= 15.9 |
|  |  |  | $R_6$= -74.3 | $S_2$= 15.0 |
| 5 | 1.617 | 38.5 | $R_7$= -42.1 | $t_5$= 5.3 |
|  |  |  | $R_8$= -664. | $S_3$= 36.6 |
| 6 | 1.526 | 54.6 | $R_9$= -231. | $t_6$= 6.3 |
|  |  |  | $R_{10}$= -80.6 | $S_4$= 10.6 |
| 7 | MIRROR | | $R_{11}$= -126.5 | |
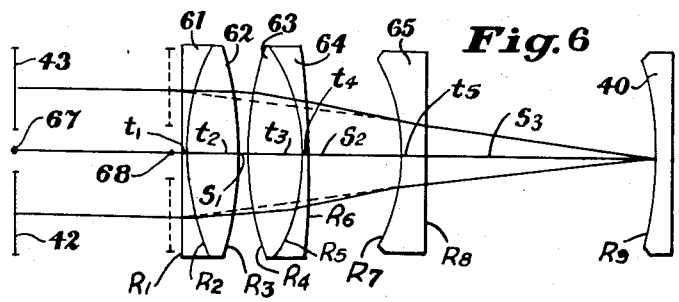
Fig. 6
Fred E. Altman
INVENTOR.
BY Daniel I. Mayne
Harold F. Bennett
ATTORNEY & AGENT United States Patent Office 2,742,817
Patented Apr. 24, 1956

2,742,817

UNIT MAGNIFICATION CATADIOPTRIC LENS SYSTEM

Fred E. Altman, Rochester, N. Y., assignor to Eastman Kodak Company, Rochester, N. Y., a corporation of New Jersey Application May 29, 1953, Serial No. 358,373

9 Claims. (Cl. 88—57)

This invention relates to catadioptric objective systems for forming a very sharp image at unit magnification in the same plane with the object.

Objectives of this type have been used for copying purposes as shown in my earlier patent with Tompkins, No. 2,234,717, and in motion-picture projectors with continuous movement of the film as shown in 1,401,345, Mechau.

The present invention was conceived and developed to fill a specific need and has been found to be more widely useful wherever a very highly corrected, high aperture unit magnification catadioptric system is needed for covering a moderately wide field. The invention was developed for use in the apparatus for continuous motion-picture projection described in copending application Serial No. 308,007, filed September 5, 1952, by Joseph Mihalyi, and particularly in the form of the apparatus shown in Fig. 7 thereof. However, when the specific example shown herein had been designed and tested, it was found to be so highly corrected at high apertures and to have so nearly perfect apochromatic color correction that it is highly advantageous for use in many other applications as well.

Objectives of the kind to which this invention relates are to be distinguished from field lenses between two objectives as shown in U. S. 1,783,998, Chretien, and French Patent 921,754, Arnulf, since a field lens system requires only a very low degree of correction of the aberrations.

According to the present invention, a unit magnification catadioptric objective is made up of a concave spherical mirror and a system of lenses for correcting the aberrations of the mirror axially aligned with the mirror and arranged between the mirror and the center of curvature thereof and adapted to receive light from an object slightly to one side of the axis, to transmit said light to the mirror, to receive the light reflected from the mirror and to focus it at an image position on the opposite side of the axis and substantially in the same plane with the object. This system of lenses comprises at least two members, a positive member near the center of curvature of the mirror and a negative member between said positive member and the mirror and closer to the positive member than to the mirror. Optionally, a weaker positive member is included close to the mirror. The powers and indices of the lens elements making up the system are so chosen that the Petzval sum of the lens system is approximately equal to the curvature of the mirror. For practical reasons the curvature of each optical surface in the lens system is numerically less than 6 times the curvature of the mirror.

By way of background, it is well known that the curvature of a surface is defined as the reciprocal of the radius of curvature, and that the Petzval sum of a mirror is numerically equal to twice its curvature. However, in contrast to positive (or collective) lenses, which have a positive Petzval sum except in special cases, a concave mirror is collective and has a negative Petzval sum.

In systems according to the invention the image-forming rays of light traverse the lens system twice and are reflected from the mirror once, hence the Petzval sum of the lens applies twice and that of the mirror applies once. Accordingly, it will be clear that the Petzval sum of the lens system needs to be equal to half that of the mirror, that is it should be numerically equal to the curvature of the mirror, to correct the Petzval sum.

By means of these features I have produced an objective system which gives an almost critical definition at 1:1 magnification and at such an aperture that the cone of rays at each image point is equivalent to that from an f/2 lens.

In the accompanying drawings:

Fig. 1 is a diagram showing a spherical mirror without supplementary lenses.

Fig. 2 is an enlarged showing of part of Fig. 1.

Fig. 3 is a graph showing the curvature of field of a mirror imaging a plane object at the center of curvature.

Fig. 4 is a diagram showing other aspects of imagery by a concave mirror alone.

Fig. 5 is a diagram showing a concave mirror combined with a single positive component.

Fig. 6 shows one form of the invention comprising a concave mirror combined with a telephoto system.

Fig. 7 shows a preferred form of the invention.

Fig. 8 gives constructional data for the optical system of Fig. 7.

Fig. 9 is a graph showing the curvature of field of the system shown in Fig. 7.

Figs. 4, 5, 6, and 7 show the respective optical systems in diagrammatic axial section.

Figure 1 is an optical diagram showing some of the optical properties of a concave spherical mirror M which has its center at C. An object point such as O is imaged by the rays reflected from the miror at an image point I approximately at the opposite side of the diagrammatic circle D.

Three rays 101, 111 and 121 are shown, and the radii 100, 110 and 120 are drawn from the center C to the points V, P and Q on the mirror upon which the rays are incident. Each reflected ray 102, 112, and 122 is on the opposite side of the corresponding radius and makes the same angle therewith as the incident ray, according to the well-known laws of reflection.

It may be noted that if an object point were located at the center C, each ray would be a radius and would be reflected back upon itself, forming a point image completely free of spherical and chromatic aberration. Unfortunately, however, in many practical applications the image and object cannot be allowed to coincide, and so this optically "perfect" arrangement is not usable.

When the object is laterally displaced from the center of curvature, as exemplified by the object point O, the image is displaced oppositely and this practical drawback is eliminated. At the same time, however, serious aberrations are introduced, which will presently be described with reference to Figure 2. Accordingly, it is an important object of this invention to correct the off-axis aberrations and to make the high degree of correction of the axial image point available over an extended field.

Figure 2 is a detail of Fig. 1 showing the circle D and the same representative rays leaving the object point O and returning after reflection substantially to the image point I. The circle D is shown purely to aid in explaining the optical principles involved. The ray 101 converges toward the axis 100 and is aimed toward the vertex V of the mirror (see Figure 1). It returns after reflection as ray 102, forming the other leg of an isosceles triangle of which the diameter 103 is the base. Reflected ray 102 intersects the circle R in two points, I and I₀, separated by a short arc the length of which depends upon the angle of the isosceles triangle and hence upon the radius of curvature of the mirror.

Another ray 111 is aimed at the intersection of the radius 110 with the mirror and returns as ray 112 forming an isosceles triangle with the base 113. The ray 112 also cuts the circle D in two points, one at the base 113 and one near the image point I. If the shape of this triangle 111, 112, 113 were the same as that of the triangle 101, 102, 103 previously discussed, the reflected ray 112 would cut the circle exactly at point I, because equal angles inscribed in a circle always subtend the same chord. Due to the base 113 being shorter, however, the angles are more nearly right angles, hence the chord subtended is more nearly equal to a diameter, and hence the ray passes between points I and $I_0$. The same is true of ray 122 which with ray 121 forms an isosceles triangle on the base 123. Thus spherical aberration enters into the imagery of off-axis points.

That astigmatism is present is shown by considering other similar sets of rays (not shown) lying in planes intersecting the plane of the diagram along the diameter 103. The tangential focus is easily visualized by considering that the image point I swings around the common intersection line 103 in passing from one of these intersecting planes to another, and the sagittal image is similarly visualized by considering that rays 112, 102, 122 fan out along the diameter 103 (extended) and that similar fans of rays in all other planes intersect this fan along that same line 103. From this it will be clear that the sagittal curvature is zero, as shown in Fig. 3.

Another point that is to be remembered is that if a plane object such as a photographic negative in a film gate were centered at O and an image plane at $I_0$, the sagittal focal lines in the image plane would not radiate from the center of the film gate, as in ordinary lens systems, but rather from the point C on the mirror axis. Likewise, if the image plane were at I, the tangential image lines would be circles centered upon the axial point C, not centered at the center point of the image area.

Thus, in spite of the great simplicity of the spherical mirror and the complete absence of aberrations at the center point, the aberrations are so serious at off-axis points (where it is practical to position the object and image) that heretofore when highly corrected systems were required the spherical mirror has been relegated to the uncritical role of field lens, merely collecting light from an objective lens focused upon the object plane and reflecting it into a relay objective focused upon the image plane.

Fig. 3 is a graph showing the tangential curvature by a broken line and the sagittal curvature by a solid line. These curvatures are given for a mirror of 100 mm. radius of curvature imaging a plane object located at the center of curvature and to one side thereof. As explained above, the sagittal curvature is zero, and the tangential image curves inward toward the mirror. The astigmatism, defined as the difference between the two curvatures, is thus equal to the tangential curvature in this case. The theoretical Petzval surface is shown as a series of x's and bends back away from the mirror.

Fig. 4 is a diagram showing a concave mirror 40 arranged for copying using the mirror alone without any lens. Since the simple mirror system is the basis of all the systems of this type, it will be described first. Referring again to Fig. 2, it will be noted that the best focus is approximately half-way between the two image points I and $I_0$, a point determined by drawing a radius perpendicular to the ray 102. The distance of this point in front of the flat field plane 103 gives the average curvature of field. There are many advantages in having the object and image arranged in symmetry, and this is done by moving the object forward by one-half the average curvature, whereupon the best image point moves backward very nearly the same distance (since the magnification is unity) and the object and image points are then symmetrical with each other and slightly in front of the ideal image plane 103. Accordingly, in Fig. 4 an object such as a film gate 42 and an image 43, are shown positioned at these symmetrical positions and oriented to lie along radii drawn from the center point C. It will be quite apparent that the astigmatism is very serious in this arrangement. Moreover, it is inconvenient to have the object and image gate at such an odd angle, and also in continuous projection of movies, it is very important to have the principal ray (i. e. the ray to the vertex of the mirror) perpendicular to the film gate and the image gate in order to avoid the well-known keystoning error. It will be readily apparent that the principal ray is not perpendicular to the object and image planes in this simple case.

Fig. 5 shows a single positive component 51 combined with the mirror to bend the principal rays so that they are parallel to the axis and perpendicular to the object and image gates 52, 53 which are in this case arranged in a plane perpendicular to the axis 100. This positive component is shown as a single element for simplicity but of course it can be readily achromatized by making it a cemented doublet. Thus, a single positive component overcomes some of the disadvantages of the mirror, and by properly choosing its focal length it can be made to correct the Petzval sum also. As already mentioned, this can be done by so choosing the indices and powers of the elements making up this component 51 so that their Petzval sum is numerically equal to the curvature of the mirror. There are, however, certain difficulties encountered in correcting the aberrations in a system of this type. In the first place, the principal rays 56, 57 strike the mirror at a steeper angle than in the case of the mirror used alone and so the astigmatism contributed by the mirror is greater and the lens has to do more correcting of astigmatism than would first appear. Another difficulty is that the lens component 51 must be bent with its more convex side toward the object plane if the spherical aberration of the principal ray is to be small, but that it must be bent with its more convex side toward the mirror (as shown) if the field is to be flattened. Still another difficulty which arises in selecting the refractive index (particularly in using a simple lens element) is that a high refractive index which would lead to less spherical aberration if the focal length were unchanged actually requires a shorter focal length and hence a higher relative aperture for the correction of the Petzval sum, and this tends to negate the advantage of the high index in regard to spherical aberration.

It will be noted that the positive component focuses the object and image on a plane closer to the mirror than the center of curvature thereof. If the lens is a simple element, it must have a focal length of $R/N$ to balance the Petzval sum. If it is then placed in telecentric position, that is, with its principal focal point at the mirror, one can easily show from elementary optical equations that the object plane would be at a distance $(N-1)^2 R/N^2$ inward from the center of curvature. In the motion-picture projector for which the present invention was developed, it is highly desirable for mechanical reasons that the object plane should be displaced as little as possible from the center of curvature. It will be clear that this last condition is best satisfied by a lens component of low index when one is considering optical systems consisting of a single positive element. Also, it will be clear that the lower the index and hence the longer the focal length for a given Petzval sum of the positive component, the smaller will be the angle of incidence of the principal rays 56 and 57 on the mirror 40, because the lens will be positioned farther from the mirror. To say the same thing in a different way, the closer the lens is to the object the less the object is magnified as viewed from the mirror position. Also as it is desirable from the standpoint of the aperture requirements of the system to have the lens close to the object plane, as an expanding pencil of rays does not expand so much in a short distance. However, there is a limit in this direction set by the practical requirement of a suitable working distance between the physical body of the lens component and the object plane. It will be obvious that the Petzval sum cannot be as large as the power of the lens component (when using a single component) or there will be direct physical interference between the lens and the focal plane.

It is well known that ordinary cemented achromatic doublets have higher Petzval sums than simple positive elements of the same focal length. The ratio of the power to the Petzval sum is equal to the refractive index in a simple element and may be designated as the "Petzval index" in any system. The Petzval index of ordinary achromatic doublets ranges from about 1.25 to about 1.5 within the range of commercially available glass types. It is readily seen that the use of an achromatic doublet permits the component to be placed closer to the focal plane than does the use of a single element, and this magnifies and displaces the focal plane less.

In a preliminary study of the problem, the astigmatism was computed for two similar examples such as shown in Fig. 5 in which the refractive index of the single element 51 was varied to study the effect thereof on astigmatism. Two values of refractive index were chosen, 1.50 which is typical of borosilicate glasses and 1.69677, a borate glass manufactured by the Eastman Kodak Company. Biconvex elements were found to leave the field undercorrected and so for this study the elements were made plano-convex as shown. The radius of curvature of the mirror was taken as 120 mm. in both cases, and the radius of curvature of the lens was chosen so as to give zero Petzval sum.

A principal ray parallel to the axis and 12 mm. therefrom was triangulated through the lens and its intersection distance computed. The mirror surface was placed at this intersection point so that the ray was reflected back symmetrically on the other side of the axis. A paraxial ray was then aimed directly at (i. e. focused on) the center of curvature of the mirror and computed backward through the lens to find the position of the object and image 52, 53. This position is, of course, in the plane conjugate to the plane 103 through the center of curvature with respect to the lens. A curvature of field computation according to the Coddington equations was begun with an object point at the center of the gate 52. This curvature computation was run through the lens and to the mirror and back along the reflected ray and through the lens again and thus the curvature of the image 53 was computed.

The results of this computation are shown in the following table:

| | | |
|---|---|---|
| N | 1.5000 | 1.69677 |
| $R_1$ | ∞ | ∞ |
| $t$ | 11.2 mm. | 10 mm. |
| $R_2$ | −40.00 | −49.28 |
| $s$ | 71.55 | 64.48 |
| R of Mirror | 120.00 | 120.00 |
| Equivalent Focal Length | 80.00 | 70.73 |
| Back Focal Distance | 80.00 | 70.73 |
| Front Focal Distance | 72.53 | 64.83 |
| Height of Parallel Ray | 12.00 | 12.00 |
| Intersection Distance | 71.55 | 64.48 |
| Spherical Aberration | −8.45 | −6.25 |
| Distance from center of curvature of mirror to lens | 37.25 | 46.52 |
| Distance of object plane from lens | 22.71 | 25.21 |
| Displacement of Object plane | 14.54 | 21.31 |
| Distance of Tangential image from lens | 22.58 | 25.11 |
| Distance of Sagittal image from lens | 24.42 | 23.84 |
| Tangential curvature | −0.13 | −0.10 |
| Sagittal curvature | +1.71 | −1.37 |

In the above table a negative value of curvature indicates undercorrected curvature, that is, the image is curved toward the lens. It will be noted that the spherical aberration of the principal ray is less in the case of the higher index element even though the relative aperture is greater. This comparison is somewhat deceiving, however, since the higher index lens should be bent still more into a meniscus shape in order to fully correct the field and that will make the spherical aberration of the principal ray worse; but on the other hand, the low index element should be bent slightly into a biconvex shape because the field is slightly overcorrected, and that bending would reduce the spherical aberration of the principal ray. Thus, if both lenses were bent to the shape which gives a flat average field, the difference in the spherical aberration of the principal ray as between the two lenses would be much smaller and might even disappear entirely. The low index lens has an advantage in some applications as previously explained in that the object and image plane is displaced only 14.54 mm. from the center of curvature of the mirror, whereas it is displaced 20.31 mm. in the case of the higher index element. On the other hand, in situations in which a larger working distance is needed, the high index element has a net advantage of 2.5 mm. in this respect. It has already been pointed out that a short working distance is very important in high-aperture systems for reducing the lens diameter necessary to avoid vignetting.

Fig. 6 shows a system according to the invention in which some of these difficulties are overcome, and the object is not magnified by the lens system. In this system the lenses 61, 62, 63, 64, 65 make up a telephoto system with front Gauss point 67 and rear Gauss point 68 in front of the objective, as is typical of telephoto systems in general. The object 42 and image 43 are located at or near the front Gauss plane and accordingly they appear to be at or near the rear Gauss plane as viewed from the mirror position and are not magnified, that is the magnification is unity.

A standard telephoto objective was first tried in this combination but was found to have too small an aperture to pass an f/2.0 pencil of rays as required. Accordingly, the usual single front doublet was divided into two doublets to get a larger aperture, and this also has a favorable effect on the Petzval sum.

Constructional data for one example according to Fig. 6 is as follows, scaled to a 100 mm. focal length of the lens system alone. (The whole system is afocal.)

| Lens | N | V | Radii, mm. | Thicknesses, mm. |
|---|---|---|---|---|
| 61 | 1.617 | 36.6 | $R_1=+156.82$ | $t_1=1.70$ |
| 62 | 1.517 | 64.5 | $R_2=+44.74$ | $t_2=11.60$ |
| | | | $R_3=-68.63$ | $S_1=1.11$ |
| 63 | 1.517 | 64.5 | $R_4=+68.63$ | $t_3=11.60$ |
| 64 | 1.617 | 36.6 | $R_5=-44.74$ | $t_4=1.70$ |
| | | | $R_6=-156.82$ | $S_2=18.61$ |
| 65 | 1.697 | 56.1 | $R_7=-41.29$ | $t_5=5.32$ |
| | | | $R_8=-529.34$ | $S_3=47.06$ |
| 66 | (Mirror) | | $R_9=-100.00$ | |

In this table the optical elements are numbered in order in the first column, as in the drawing, the refractive index N and the dispersive index V of each lens element are given in the second and third columns, and the Radii R of the optical surfaces, the thicknesses $t$ of the lens elements and the spaces S between lens elements, each numbered by subscripts in order from front to rear, are given in the last two columns. The + and − values of the radii indicate surfaces respectively convex and concave to the front.

This telephoto arrangement solved the problem of imaging the object or film gate without enlarging its apparent size and can even be made to image it at a decreased apparent size by placing the real object still closer to the lens. Also, the average curvature of field and the spherical aberration of the principal ray are highly corrected by a proper choice of lens shapes, so that a telephoto system is highly satisfactory for many applications. Still, because of the separation of the Gauss points, which in this case is more than 32 mm., the real position of the film gate 42 is too far removed from the center of curvature of the mirror (which is at the rear Gauss point 68) to satisfy the specific requirements of the use for which the system was originally intended as described above. Moreover, the Petzval sum is too small to fully correct that of the mirror, the "Petzval index" being about 2.6

Fig. 7 shows the preferred system in which all these disadvantages are overcome. The positive component of the telephoto system is divided up into two biconvex doublets made up of the elements 1, 2, 3 and 4, the same as in Fig. 6 except that both doublets are turned with the flint glass forward. The negative component of the telephoto consists of the lens element 5 which is meniscus in shape and concave toward the positive member. In order to contribute to the positive Petzval sum, a positive element 6 is added as close to the mirror as can conveniently be arranged. This positive member may consist of a simple element. Because it is very near the principal focus of the lens system it contributes greatly to the positive Petzval sum without changing the equivalent focal length appreciably. Also, since it is near the principal focal point, it has very little effect on the rear Gauss point but brings the front Gauss point back closer to the lens or actually within the lens. If the focal length of this element is properly chosen, the two Gauss points can be made to coincide or nearly coincide and thus the relative positions of the film gate and its virtual image as seen from the mirror are nicely adjusted to the desired condition. Also, by mutual bendings of the positive components and the negative component and by adjusting the space $S_2$ between the positive member and the negative member of the telephoto combination, the curvature of field or astigmatism and the aberration of the principal ray are corrected to an extremely high degree. While the spherical aberration of the principal ray does not actually affect the sharpness of image, it does have an important effect in regard to the keystoning error. The sharpness of image is, of course, controlled by the spherical aberration of the image-forming pencil along the principal ray, and this is controlled to a high degree by the shape of the meniscus positive element 6.

Fig. 8 shows constructional data for one example according to the invention as shown in Fig. 7. This table of data is repeated as follows:

| Lens | N | V | Radii, mm. | Thicknesses, mm. |
|---|---|---|---|---|
| 1 | 1.689 | 30.9 | $R_1=+91.2$ | $t_1 = 1.7$ |
| 2 | 1.526 | 54.6 | $R_2=+30.8$ | $t_2=15.9$ |
|   |       |      | $R_3=-74.3$ | $S_1=1.1$ |
| 3 | 1.689 | 30.9 | $R_4=+91.2$ | $t_3=1.7$ |
| 4 | 1.526 | 54.6 | $R_5=+30.8$ | $t_4=15.9$ |
|   |       |      | $R_6=-74.3$ | $S_2=15.0$ |
| 5 | 1.617 | 38.5 | $R_7=-42.1$ | $t_5=5.3$ |
|   |       |      | $R_8=-664$  | $S_3=36.6$ |
| 6 | 1.526 | 54.6 | $R_9=-231$  | $t_6=6.3$ |
|   |       |      | $R_{10}=-80.5$ | $S_4=10.6$ |
| 7 | (Mirror) | | $R_{11}=-126.5$ | |

The arrangement of this table is the same as that of the previous table, and the focal length of the lens system alone is 100 mm. as before.

The Petzval sum of the lens system is $+0.0084$ and thus the Petzval index is only 1.19. The Petzval sum of the whole system, i. e. the contribution of the mirror plus twice that of the lens system, is $+0.0010$. Accordingly, in the absence of astigmatism, a surface with a curvature of $+.0005$, that is a radius of curvature of 2000 mm., concave toward the optical system, would be sharply imaged upon itself. Theoretically the object or film gate should be tangent to this curve, that is to say, the principal ray should aim at an axial point about 2000 mm. away and behind the mirror.

The extremely high degree of correction of this system is shown in the following data:

An axial point 5.3 mm. in front of the front surface of the lens system or 115.4 mm. actual distance from the mirror is imaged by the lens system at a magnification of 1.31 and at a virtual distance of 127.1 mm. from the mirror, the spherical and chromatic aberration of the image being as follows:

|  | C | D | F |
|---|---|---|---|
| f/2.0 | −.025 | −.022 | −.004 |
| f/2.8 |  | −.035 |  |
| Paraxial | +.015 | .000 | −.001 |

The minus signs indicate that the marginal rays appear to intersect the axis farther from the mirror than the paraxial rays.

The almost total absence of chromatic aberration in this system is noteworthy, as in the extremely small zonal spherical aberration. The coma of this image is also corrected.

The sine condition and distortion of the entire system are corrected automatically because of the symmetry of the system.

A number of rays from object points 10.34 mm. and 15.20 mm. from the axis were computed through the lens system to the mirror and back through the lens system to the corresponding image points. The primary and secondary curvature and the differential height of intersection of each ray with the image plane above or below the principal ray (indicated by + or − signs) is as follows:

|  | 10.34 mm. | 15.20 mm. |
|---|---|---|
| Curvature: |  |  |
| Primary | −.30 | −.39 |
| Secondary | −.06 | −.08 |
| Intersection heights: |  |  |
| Upper rim ray | −.006 | +.064 |
| Upper zone | −.028 | −.014 |
| Principal ray | .000 | .000 |
| Lower zone | +.025 | +.015 |
| Lower rim ray | +.004 | −.076 |

Fig. 9 shows this curvature graphically for comparison with Fig. 3. It will be evident to those skilled in the art that the above data indicate extremely sharp imagery, which was actually found when the system was made up and tested.

The spherical aberration of the principal ray is small, although naturally it is not as highly corrected as the image point itself. It is well known from fundamental optical theory that it is impossible to correct the spherical aberration at more than two separate points on the axis of any optical system. The ideal principal ray at 10.34 mm. from the axis has −0.705 mm. aberration and that at 15.20 has −1.303 mm. at their intersection with the axis substantially at the mirror. This is a completely harmless aberration for most purposes, since it merely means that what is really the principal ray (i. e. the one that actually strikes the center of the mirror) is not precisely perpendicular to the object plane.

The equivalent focus of the lens system itself is given at 100 mm. and this is within a few percent of the actual size in which it was made up for a 16 mm. movie projector. The distance measured transverse to the axis between the center of the object gate and the center of the image gate is 23.1 mm. on this given scale.

What I claim is:

1. A catadioptric system for forming images at substantially unit magnification, consisting of a concave spherical mirror and a lens system of positive power axially aligned with the mirror and arranged between the mirror and the center of curvature thereof, the lens system consisting of a plurality of lens elements including at least one of each sign, in which the lens component nearest the object plane is positive in power and has its surface which faces the mirror convex and more strongly curved than the surface which faces the object plane, said lens system having a focal length between ½ and 1 times the radius of curvature of the mirror and having a Petzval sum numerically between 0.9 and 1.1 times the curvature of the mirror, and each optical surface in the optical system having a curvature numerically smaller than six times that of the mirror, whereby the curvature of field is corrected and an object on one side of the axis in the vicinity of the center of curvature of the mirror is sharply imaged on the other side of the axis in substantially the same transverse plane.

2. A catadioptric system comprising a concave spherical mirror and a lens system of positive power in axial alignment therewith and arranged between the mirror and the center of curvature thereof, said lens system comprising a positive member nearest the center of curvature of the mirror and a negative member spaced therefrom, the side of the positive member facing the negative member being convex and at least as strongly curved as the side facing the center of curvature of the mirror, and the negative member being meniscus in shape and concave toward the positive member, the lens system having a focal length between 0.5 R and R, where R is the radius of curvature of the mirror, and a Petzval sum between 0.9/R and 1.1/R, and each optical surface in the lens system having a curvature numerically smaller than six times that of the mirror.

3. A catadioptric system according to claim 2 in which the said lens system includes a positive member between the negative member and the mirror and closer to the latter.

4. A catadioptric system according to claim 2 in which the positive member nearest the center of curvature of the mirror consists of two biconvex components at least one of which is compound.

5. An optical system according to claim 4 in which the negative member consists of a single negative element.

6. A catadioptric system according to claim 1 in which the Petzval sum of the lens system forming a part thereof is greater than three-quarters of the reciprocal of the focal length of said lens system.

7. A catadioptric system for forming images at substantially unit magnification and substantially in the same plane with the object, comprising a concave spherical mirror and a lens system of positive power axially aligned between the mirror and the self-conjugate object plane, said lens system comprising two biconvex compound components adjacent to the object plane and a meniscus negative component spaced between the biconvex components and the mirror and concave toward the biconvex components, each biconvex component comprising at least one element of each sign, at least one biconvex component having a dispersive cemented surface convex toward the object plane, and the curvature of each lens surface in the optical system being numerically less than six times that of the mirror.

8. A catadioptric system for forming images at substantially unit magnification and substantially in the same plane with the object, comprising a concave spherical mirror, and a collective lens system axially aligned in front of the mirror and between it and the self-conjugate object plane, said lens system comprising two positive doublets adjacent to the object plane and a negative component spaced between the positive doublets and the mirror and concave toward the positive doublets, in which the refractive index of each lens element is between 1.50 and 1.70 and the radii of curvature of the front and rear surfaces $R_1$, $R_3$, $R_4$, $R_6$, $R_7$, and $R_8$ of the respective components in order from front to rear are within the ranges set forth as follows:

$$0.9\ f < +R_1 < 1.6\ f$$
$$0.6\ f < -R_3 < 0.8\ f$$
$$0.6\ f < +R_4 <\ f$$
$$0.7\ f < -R_6 < 1.6\ f$$
$$0.3\ \ < -R_7 < 0.5\ f$$
$$4\ \ \ < -R_8 \leq \infty$$

where f is the focal length of the lens system, and in which the mirror is located at the locus of the axial intersection point determined by tracing through the lens system a ray which strikes the front of the lens system parallel to the axis, the power of the lens system being between 1 and 2 times and the Petzval sum of the lens system being between 0.9 and 1.1 times the curvature of the mirror.

9. A catadioptric system substantially according to the following specifications:

| Lens | N | V | Radii | Thicknesses |
|---|---|---|---|---|
| 1 | 1.69 | 31 | $R_1 = +.91\ f$ | $t_1 = .02\ f$ |
|   |      |    | $R_2 = +.31\ f$ | $t_2 = .16\ f$ |
| 2 | 1.53 | 55 | $R_3 = -.74\ f$ | $S_1 = .01\ f$ |
| 3 | 1.69 | 31 | $R_4 = +.91\ f$ | $t_3 = .02\ f$ |
|   |      |    | $R_5 = +.31\ f$ | $t_4 = .16\ f$ |
| 4 | 1.53 | 55 | $R_6 = -.74\ f$ | $S_2 = .15\ f$ |
| 5 | 1.62 | 38 | $R_7 = -.42\ f$ | $t_5 = .05\ f$ |
|   |      |    | $R_8 = -6.6\ f$ | $S_3 = .37\ f$ |
| 6 | 1.53 | 55 | $R_9 = -2.3\ f$ | $t_6 = .06\ f$ |
|   |      |    | $R_{10} = -.81\ f$ | $S_4 = .11\ f$ |
| 7 | Mirror |  | $R_{11} = -1.3\ f$ |  | where f is the focal length of the lens system taken separately from the mirror and where the elements are designated by numbers in the first column and the corresponding refractive indices N for the D line of the spectrum and the dispersive indices V are given in the second and third columns and the radii R, thicknesses t and spaces S, each numbered by subscripts from front to rear are given in the last two columns, the positive and negative radii indicating surfaces respectively convex and concave to the front.

References Cited in the file of this patent

UNITED STATES PATENTS

| 2,141,884 | Sonnefeld | Dec. 27, 1938 |
| 2,350,112 | Houghton | May 30, 1944 |
| 2,490,747 | Creighton | Dec. 6, 1949 |
| 2,559,799 | Rinia | July 10, 1951 |

FOREIGN PATENTS

| 426,539 | Great Britain | Apr. 4, 1935 |
| 848,901 | Germany | Sept. 8, 1952 |